Aug. 8, 1950  L. S. MEYER  2,518,164
APPARATUS FOR PRODUCING COMPOSITE SHEET MATERIAL
Filed July 2, 1946  5 Sheets-Sheet 1

LEONARD S. MEYER
INVENTOR

BY Ross C. Hurrey

Aug. 8, 1950 L. S. MEYER 2,518,164
APPARATUS FOR PRODUCING COMPOSITE SHEET MATERIAL
Filed July 2, 1946 5 Sheets-Sheet 2

LEONARD S. MEYER
INVENTOR
BY Ross Ch Hurvey

Aug. 8, 1950 L. S. MEYER 2,518,164
APPARATUS FOR PRODUCING COMPOSITE SHEET MATERIAL
Filed July 2, 1946 5 Sheets-Sheet 3
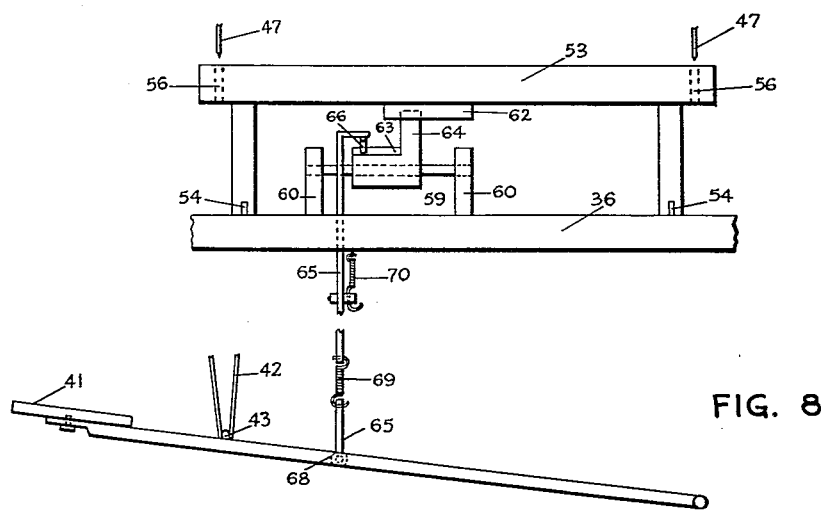
FIG. 8
FIG. 9
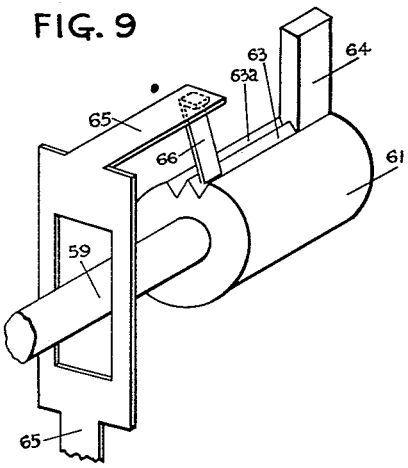
FIG. 10
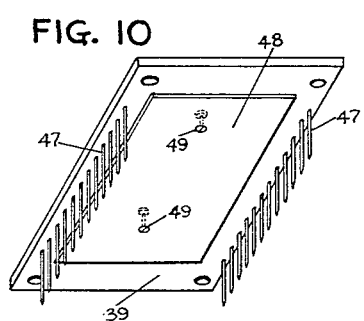
LEONARD S. MEYER
INVENTOR
BY Leonard S. Meyer
INVENTOR Aug. 8, 1950 L. S. MEYER 2,518,164
APPARATUS FOR PRODUCING COMPOSITE SHEET MATERIAL
Filed July 2, 1946 5 Sheets-Sheet 5

LEONARD S. MEYER
INVENTOR

BY

Patented Aug. 8, 1950

2,518,164

UNITED STATES PATENT OFFICE 2,518,164

APPARATUS FOR PRODUCING COMPOSITE SHEET MATERIAL

Leonard S. Meyer, Newark, Ohio

Application July 2, 1946, Serial No. 681,112

8 Claims. (Cl. 154—1)

This invention relates to a new and novel product formed of sheet material, and to a novel process and apparatus for producing said product.

The novel product is an assemblage of sheets of a non-planiform character, having elevations and depressions in each sheet and bonded together in sandwich form so that the elevations and depressions of each sheet are opposed to, or in register with the depressions and elevations, respectively, of adjacent sheets. The product thus formed achieves the maximum composite thickness afforded by height and depth of the depressions and elevations of the component sheets. Depending upon the exact configuration of sheets employed, novel effects in rigidity, elasticity, insulating characteristics, etc., may be achieved.

While, as will be described below in more detail, sheets having a variety of configurations may be employed, the product is advantageously formed of sheets of corrugated stock. When such sheets are assembled according to the invention, a "honeycomb" structure results, with the ridges and grooves of adjacent sheets forming a plurality of individual cells. This product, also, is highly rigid in the line of the axis of these cells, but is relatively elastic in a line transverse thereto.

The sheets from which the assembled product is formed may be of any material suitable to the intended use. Materials such as paper, textile fabrics, glass fabric, and various plastics, may be employed for the sheet material.

The individual sheets forming the product may be bonded together by suitable adhesives either during or after the assembly process. For example, a thermosetting adhesive may be applied to the sheets, and hardened or set by the application of heat during the assembly process, or thereafter; or a thermosetting adhesive may be applied and hardened, or set, during or after the assembly process. A typical thermosetting commercial resin, which can be employed is termed "Plaskon 911"; a typical thermoplastic resin is commercially known as "Weldwood—Cold Setting."

Depending upon the type of material employed, a preliminary treatment of the individual sheets with the adhesives mentioned in the preceding paragraph may be given in order to increase their strength and set them in the nonplaniform shape desired. For example, a sheet of glass fabric may be formed with the desired elevations and depressions—or with corrugations—and treated with a thermoplastic or thermosetting resin, and hardened. Such preliminary treatment is in addition to the application of the adhesive for bonding the sheets together, mentioned in the preceding paragraph.

Alternatively, a sandwich structure may be built up with the sheets maintained in the desired relationship by means of binding elements applied during the assembly process. In a preferred form these consist of tubular elements driven through the sheets and removable from the assembly machine with the sandwich structure. The ordinary type of commercial paper or plastic drinking straw can be employed for such binding elements. When these are employed the sandwich structure can be formed without adhesive, with or without the addition of facing sheets; or the binding elements may be employed to preserve the relative relationship of sheets impregnated with an unset adhesive, in cases where it is desired to remove the structure from the machine prior to setting or hardening such adhesive.

Whether the product is formed with or without the use of adhesive, the assembled sandwich may be given added strength and finish by the application of flat facing sheets or other covering or binding material.

The process which forms part of the invention includes the steps of successively penetrating sheets of the material described above, in such manner that the sheets are brought into contact with the elevations and depressions of each sheet opposed to, or in register with, respectively, the depressions and elevations of adjacent sheets. The penetrating of the sheets with removable binding elements such as described above, and process steps relative to the application of adhesive to the sheets, and curing of the assembly, form additional parts of the process.

The apparatus which forms part of the invention assembles a plurality of nonplaniform sheets of the type described into a sandwich structure in which the sheets are in predetermined relationship to each other. Novel features of the device allow for automatic registering of separate sheets, and for the ready removal of the sandwich from the device, without disturbing the relationship of component sheets.

Further objects and advantages of the invention will appear from the following description of the drawings, wherein:

Fig. 8 is an end elevation, showing the operation of the work plate shifting device of the apparatus;

Fig. 9 is a further perspective detail thereof;

Fig. 10 is a fragmentary perspective of a removable work holding plate attached to the sheet pickup plate of the device;

Figure 1:
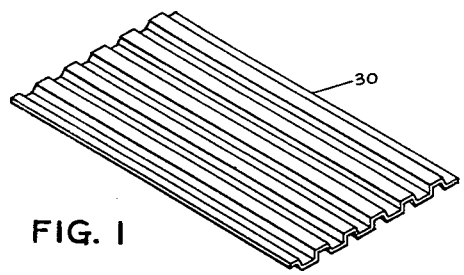
Fig. 1 is a perspective view of a single sheet of corrugated sheet material, to be assembled in a sandwich structure according to the invention.
Figure 2:
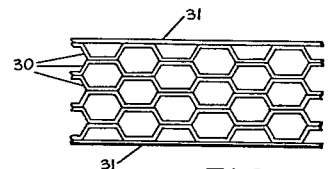
Fig. 2 is a transverse sectional view showing a plurality of such sheets assembled according to the invention.

Figs. 1-6 illustrate some of the sandwich structures comprising the novel product of this invention. In Fig. 1, a single sheet 30 is shown consisting of corrugated material of paper, textile, glass fabric or the like. In Fig. 2, a plurality of these sheets 30 are shown, assembled in a sandwich or honeycomb-like structure with the lands and grooves of adjacent sheets in register and in surface contact. In the finished product the contact points of the respective sheets will have been treated with an adhesive which when hardened or set, will bond the sandwich structure firmly together. For simplicity of illustration, Fig. 2 shows only six sheets so assembled; obviously the sandwich may consist of any number of such sheets built up to the desired thickness. In Fig. 2, the sandwich of corrugated sheets has been finished by the addition of flat facing sheets 31 applied to the external faces of upper and lower sheets 30, and likewise bonded to them by a suitable adhesive.

Figure 3:
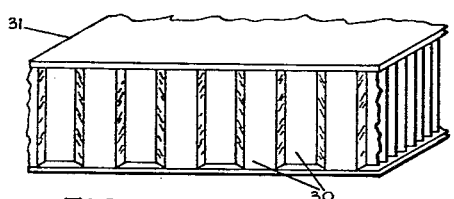
Fig. 3 is a perspective view showing another assembly of said corrugated sheets.

In Fig. 3, a sandwich structure of sheets 30, composed like that shown in Fig. 1, has been assembled, but in this example the sandwich has been sliced transversely of the contacting lands and grooves (i. e., at 90° to the axis of the cells formed by adjacent lands and grooves), and the flat facing sheets 31 have been bonded to the sandwich on the plane surfaces thus formed (likewise at 90° to the axis of the cells).

Figure 4:
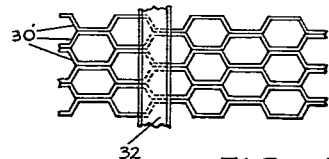
Fig. 4 is a transverse sectional view of a plurality of corrugated sheets penetrated by a binding element.

Fig. 4 illustrates a sandwich structure assembled according to a modification of the invention, whereby a plurality of sheets 30 are held together and with the desired registry of lands and grooves, by binding elements such as the tubular binding element 32. This structure will be further described with reference to the modified apparatus shown in Figs. 17-19.

Figure 5:
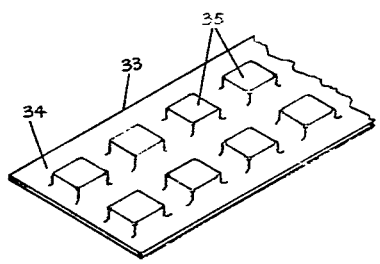
Fig. 5 is a perspective view of an alternative form of sheet material which may be employed in lieu of the sheets shown in Figs. 1-4.

Fig. 5 shows a sheet 33 characterized by a plane surface area 34 and raised projections 35. A section of a plurality of such sheets is shown assembled in Fig. 6. The sheets of Figs. 5 and 6 may be assembled, bonded, cut, and surfaced with surface sheets in the same manner described for Figs. 1-4.

Figure 6:
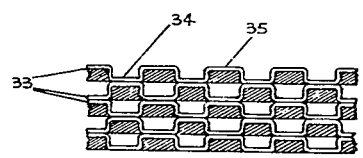
Fig. 6 is a transverse sectional view of a plurality of sheets of the type shown in Fig. 5, assembled according to the invention.

The sheets shown in Figs 5 and 6 may be advantageously formed of molded pulp, in a fashion similar to the preparation of egg flats used in the shipping of eggs. Such pulp sheets may be given added strength by impregnating them with an adhesive coating and hardening this coating prior to assembly. If such a preliminary coating is applied, additional adhesive is employed in the assembly of a sandwich of such sheets.

While two types of sheets have been illustrated in the figures just described as suitable material for forming the sandwich structure comprising the product of this invention, it is obvious from such illustrations that any sheet having elevated and depressed surfaces capable of being placed in register and so bonded together, are useful with the invention.

Figs. 7-10 and Fig. 16 illustrate one embodiment of the apparatus adapted to assemble the product of the invention. A table 36 carries the sheet assembly elements, including a top frame 37 supported on four tubular shafts 38 carrying the sheet pickup plate 39. Plate 39 is mounted on shafts 38 for vertical movement by means of sleeves 40. Plate 39 is raised and lowered by means of foot treadle 41 connected to the plate 39 by cable 42. Cable 42 passes over pulleys 43, 44, 45, 46, and a similar pulley wheel (not shown) at the rear of table 36.

Plate 39 carries, at its opposite longitudinal edges, two rows of evenly spaced sheet pickup pins 47. Fig. 10 shows the underside of plate 39 carrying the pins 47 and also a removable work holding plate 48 secured to the plate 39 by means of two flat-headed bolts 49. Plate 48 is removable when it is desired to remove a sandwich of assembled sheets from the machine, as will be further described.

Top frame 37 (see Fig. 7) carries at either side a pair of hinged straps 50, connected to each other by a tensioning spring 51 and formed with an angle at 52 so as to engage and support the sheet pickup plate 39 while sheets are being placed in the apparatus.

The table 36 supports the work holding plate 53 (Figs. 7 and 8), which is slidably mounted on tracks 54 for lateral shifting movement in opposite directions parallel to the line of pins 47. At either side of plate 53 are adjustable stops 55 and 55a (see Figs. 7 and 12-15) for regulating the shifting movement of plate 53. The surface of plate 53 is shown as corrugated in the same form of the sheets shown in Figs. 1-4 in order to provide a good holding surface for such sheets. Obviously plates having surfaces adapted to other types of sheets, such as the sheet shown in Figs. 5 and 6, can be substituted.

Plate 53 is penetrated by two sets of holes 56, one set of which allows the sheet pickup pins 47 to pass through the plate 53 when plate 53 is shifted in one direction; the other set of which accommodates the pins when plate 53 has been shifted in the opposite direction.

Internally of plate 53 is provided an electrical heating coil 57 (cutaway portion, Fig. 1) which may be connected to an electrical outlet by cord 58. This coil is employed when it is desired to heat a sandwich structure of sheets during the assembly thereof, as will be further described for Figs. 11–15.

Details of the shifting means for plate 53 are shown in Figs. 8 and 9. A shaft 59, mounted beneath plate 53 and journalled for rotary movement in the uprights 60, carries the shifting device 61. The upper side of the shifting device 61 is longitudinally cut by a pair of adjacent V-shaped slots 63 and 63a, together forming a W-shaped portion in the cross section of device 61. A projecting key member 64 is also formed on the upper side of shifting device 61, and bears in a slot formed in the member 62 on the underside of plate 53.

Rotary movement of shifting device 61, first in one direction and then in the other during successive cycles of operation of the apparatus is obtained by the treadle connected shaft 65 whose upper end forms an angle over slots 63 and 63a and carries an actuating pin 66. Actuating pin 66 is preferably formed of spring metal to give it resiliency.

Shaft 65 is journalled through table 36 for vertical movement and is coupled to crossbar 67 on treadle 41 by a sleeve 68. Shaft 65 is interrupted and the ends coupled near its lower end by tension spring 69. Another tension spring 70, exerting pull in the opposite direction, is connected between shaft 65 and the underside of table 36.

Figure 7:
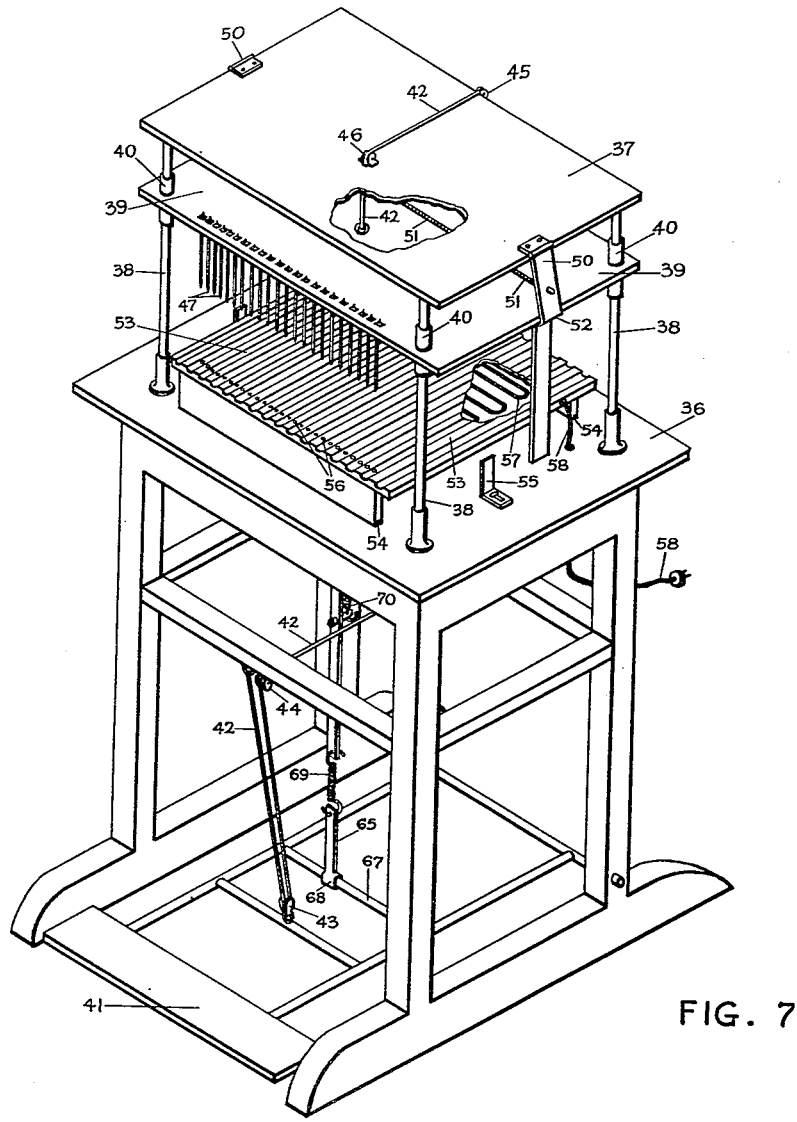
Fig. 7 is a perspective view showing the assembly apparatus, with the work holding bars 80 (see Fig. 16) omitted.

The operation of the shifting means just described is as follows: It is assumed that in Figs. 8 and 9 that the treadle 41 has been partway depressed, causing a downward movement of shaft 65 and consequent lowering of pin 66 into the V-shaped slot 63. As seen in Fig. 9, pin 66 is bent rightwardly as it enters slot 63. Continuing the downward movement of treadle will cause pin 66 to reach the bottom of slot 63 and exert a turning movement, clockwise in Fig. 9, to the shifting device 61. This movement will be transmitted by key 64 to the work holding plate 53 which will slide on tracks 54 until it reaches the adjustable stop 55 (Fig. 7). Any further depression of treadle 41 will impart no further movement to the mechanism because of the stop 55, but will merely cause spring 69 to stretch, thus preventing damage to pin 66.

Downward pressure on the treadle 41 also causes sheet pickup plate 39 (Fig. 7) to be raised upwardly by the operation of cable 42. When pressure is released on the treadle, the plate 39 will lower of its own weight, and tension exerted by cable 42 will raise treadle 41. During the raising of treadle 41, tension on spring 69 is released and spring 70 will exert an upward pull on shaft 65, lifting pin 66 out of engagement with slot 63.

On the next downward movement of treadle 41, by virtue of the clockwise movement of the shifting device 61 just described, actuating pin 66 will be centered over and engage slot 63a instead of slot 63, thus producing a counterclockwise rotation of device 61 and consequent movement of plate 53 in the opposite direction, to the limit permitted by the opposite stop 55a. On the next successive downward movement of treadle 41, pin 66 will again engage slot 63, and plate 53 will return to the position first described.

Stops 55 and 55a control the limit of movement of plate 53 and can be adjusted to define the exact amount of shifting movement of plate 53. The plate 53 should be adjusted to shift, first in one direction, and then in the other, a distance equal to the distance between the center of a depression and the center of its adjacent elevation in the sheets to be assembled. The shifting movement of plate 53 will thus cause successive sheets placed thereon to be picked up by pins 47 with the depressions and elevations on one sheet in register with the elevations and depressions respectively, of adjacent sheets.

Figure 16:
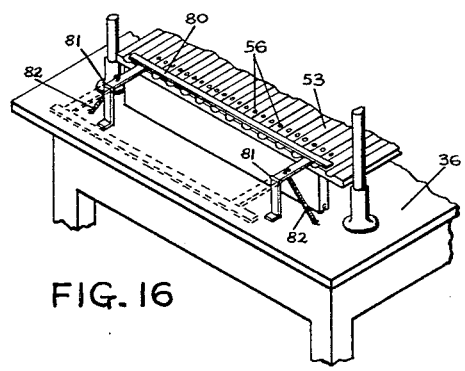
Fig. 16 is a fragmentary perspective view showing a pair of work holding bars omitted from other views of the apparatus.

Fig. 16 shows one of a pair of work holding bars 80, which bars are omitted from the other views of the apparatus. Bars 80 are mounted on table 36 parallel to the sides of work holding plate 53. Bars 80 are hinged at 81 and provided with tension springs 82 which hold bars 80 against the upper edges of plate 53 when in the engaged position shown in Fig. 16. Bars 80 bear on plate 53 outwardly of the lines of holes 56 to avoid interference with the sheet pickup pins which pass through holes 56. Thus engaged, bars 80 serve to hold a sheet of material flat on plate 53 until it has been penetrated by the pickup pins. In rest position, the bars 80 may be swung to the dotted line position shown in Fig. 16.

Figs. 11–15 illustrate the mode of assembly of a sandwich of sheets of the type described in Figs. 1–3. In these views, for simplicity of illustration, only three of the pins 47 are shown, and the treadle 41 with its connecting parts is omitted.

Figure 11:
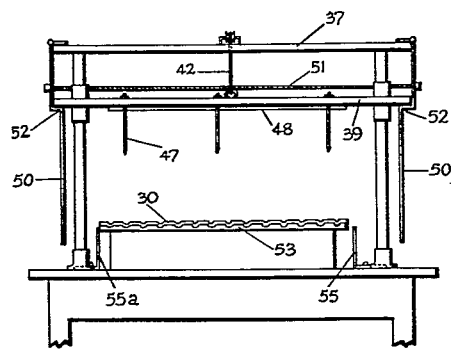
Figs. 11-15 are diagrammatic elevations of the apparatus illustrating certain of the assembly steps.

In Fig. 11, it is assumed that the treadle is in lowered position. Sheet pickup plate 39 is in "rest" position supported by the angles 52 of hinged straps 50, leaving the operator free to insert material into the apparatus. The removable work holding plate 48 has been bolted to the underside of pick-up plate 39 (as in Fig. 10). The lower shifting work holding plate 53 is against the left hand stop 55a. A sheet of corrugated material 30 is placed with its lands and grooves in the corresponding lands and grooves of plate 53.

Figure 12:
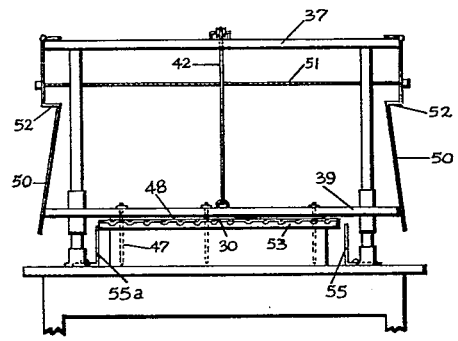

To pick-up sheet 30 (and successive sheets), the operator spreads the straps 50 allowing the pickup plate 39 to drop on plate 53 driving the pins 47 through the edges of the sheet 30. This part of the operation is shown in Fig. 12.

Figure 13:
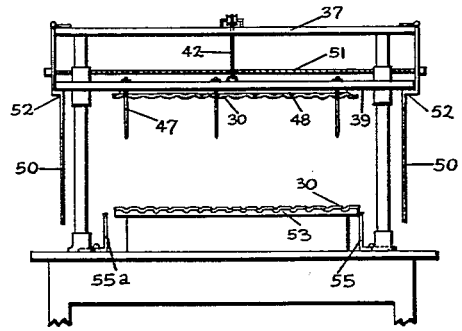
Figure 14:
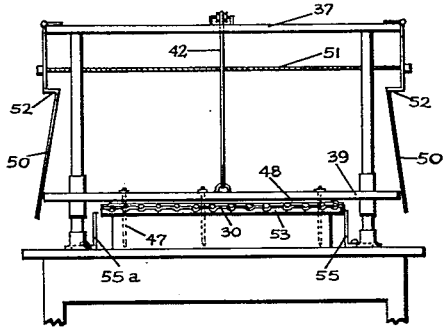

In Fig. 13, plate 39 has been raised by depressing the treadle, plate 39 carrying with it the first sheet 30. As has been previously described with reference to Figs. 8 and 9, depression of the treadle causes plate 53 to shift rightwardly against stop 55 as shown in Fig. 13. This shift is calculated to bring the next sheet 30 placed on plate 53 with its lands and grooves beneath the grooves and lands respectively, of the first sheet. While in this relationship the pick-up plate 39 is again lowered, as in Fig. 14, illustrating two sheets being brought together in the relationship shown in Fig. 2.

Figure 15:
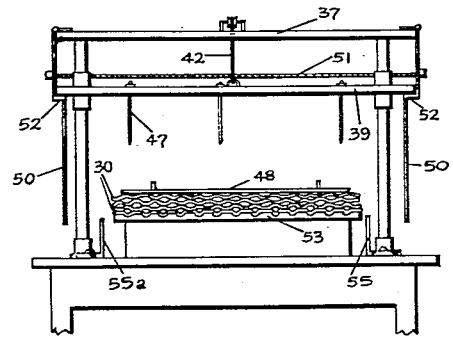

The procedure shown in Figs. 11–14 may be repeated until a sandwich of the desired thickness is built up. When the sandwich is ready for removal from the apparatus, plate 39 is lowered and the removable work holding plate 48 unbolted and left resting on the sandwich while plate 39 is raised, thus removing the pins 47 from the sheets. Fig. 15 illustrates this operation.

In the assembly operations just described, a thermosetting adhesive may be employed to bind the successive sheets together either during or after the operation. If it is desired to cure or harden the adhesive during the operation, the sheets are coated on their contact surfaces with a thermosetting adhesive before they are placed on plate 53. Ordinarily it will only be necessary to apply adhesive to the upper surface lands of each sheet. Heat is then applied to plate 53 (by means of electric heating coil 57, Fig. 7) and the assembly steps followed until a sandwich is formed. When the assembly is completed, if the curing requires further time, the sandwich may be left in the apparatus in the condition shown in Fig. 15.

Alternatively, if it is desired to bond the sandwich of sheets with a thermosetting adhesive, and to cure or harden the adhesive apart from the machine, heat is not applied to plate 53. Sheets coated with such adhesive may be brought to the stage shown in Fig. 15, and thereafter, a plate 48a corresponding in dimensions to plate 48 may be slipped beneath the uncured sandwich, and the sandwich removed and placed in suitable clamps so that the structure will not be disturbed while cured in an oven or other suitable heating means. A sandwich structure thus prepared for curing is shown in Fig. 20, held by clamp 71.

Alternatively, if it is desired to employ a thermoplastic adhesive, heat may be applied to plate 53 to keep the adhesive in an unset condition until the sandwich is assembled; whereupon it may be allowed to cool and set.

Figure 20:
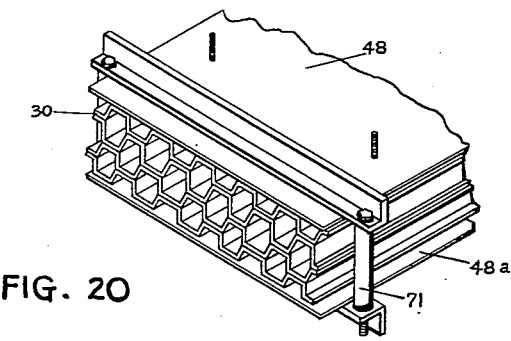
Fig. 20 is a fragmentary perspective illustrating a sandwich structure prepared for curing.

Alternatively, if the sandwich is to be assembled without prior application of adhesive, the sandwich may be removed from the apparatus by the means shown in Fig. 20, whereupon it may be bonded together by adhesive or by other means.

Figure 17:
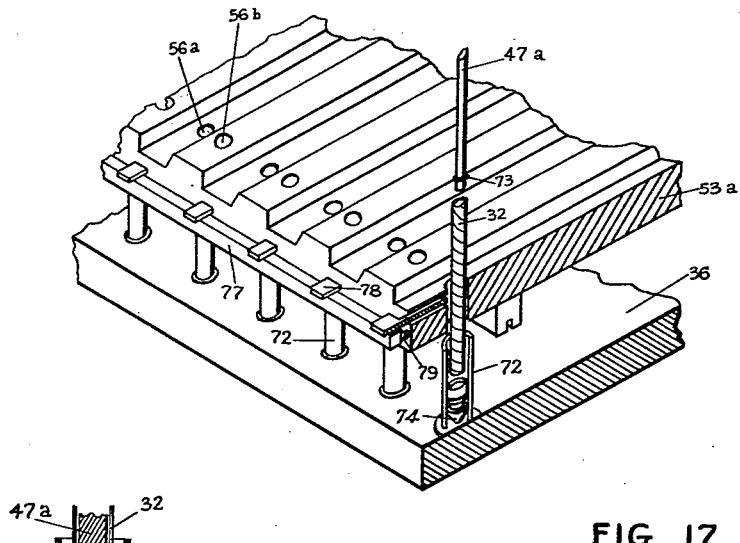
Fig. 17 is a fragmentary perspective view, with cutaway portions illustrating a modified form of the apparatus.
Figure 18:
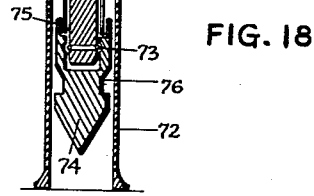
Figs. 18 and 19 are detailed perspectives showing details of the penetration pin cap removal means of said modification.
Figure 19:
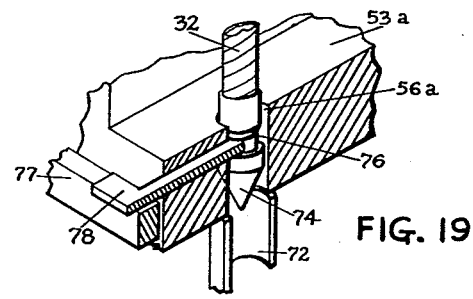

The modified form of apparatus shown in Figs. 17–19 is adapted to assemble the product described with reference to Fig. 4. The penetration of successive sheets of material by a plurality of tubular binding elements which are removable with the completed sandwich (and may, if desired be left in the finished structure) is accomplished by changes and additions in the work holding plate and penetrating pick-up pins as heretofore described.

In Fig. 17 the lower work holding plate 53a is shown with two sets of holes 56a and 56b adapted to receive the penetrating pins. Under one set of these holes 56a is located a line of cups 72. Pins 47a have rounded tips and are provided near their ends with annular slots adapted to hold the spring wire rings 73. The removable penetrating caps 74 are provided with internal annular grooves adapted to snap over the rings 73, as shown in Fig. 18. The upper portion of caps 74 are provided with collars 75 which support the tubular binding elements 32 on pins 47a. Caps 74 are also provided with an outer annular locking groove 76 which are engaged by the cap-removing means described below.

The cap removing means comprises a finger bar 77 carrying a plurality of fingers 78 which penetrate edges of plate 53a and connect with the set of holes 56. Finger bar 77, when not in use, is held by springs (see spring 79, Fig. 17) with the fingers 78 out of engagement with holes 56a.

The installation and removal of the tubular binding elements prior to and succeeding the assembly of a sandwich of sheets, is as follows: As shown in Fig. 17, plate 53a is shifted so that holes 56a are centered over cups 72. Caps 74 are dropped point down through holes 56a, into the cups 72 which are of slightly larger diameter so as to support the caps 74 upright. Next, tubular binding elements 32 are lowered through holes 56a into cups 72 to rest within the collars 75 of caps 74. Next, the sheet pick-up plate carrying pins 47a is lowered, threading the pins 47a through the binding elements 32 and into gripping engagement with caps 74. Caps 74 will be picked up as shown in Fig. 18.

When an assembly of sheets is ready for removal from the machine, the operator again locates plate 53a with holes 56a over cups 72, and lowers pins 47a into holes 56a until fingers 78 are opposite the grooves 76 of caps 74. Then by pressing finger bar 77 thus engaging fingers 78 in grooves 76, and lifting the pins 47a, caps 74 may be detached and will fall into cups 72 ready for the next operation. The removal of the caps as just described, is shown in Fig. 19. Pins 47a, with caps thus removed, may be raised until pins 47a are withdrawn from the binding elements 32, whereupon the sandwich of assembled sheets may be removed without danger of disturbing their condition.

The employment of the binding elements 32 in the assembly of a sandwich of sheets is particularly desirable when such sheets are assembled and removed from the assembly apparatus prior to the application of an adhesive or other binding means, or when a sandwich of sheets treated with an adhesive is to be removed from the apparatus and the adhesive cured or hardened subsequently. The binding elements in all cases aid in the preservation of the sandwich structure in the condition in which it is assembled. They may be left in the finished structure, or trimmed from the edges of the structure after the sheets have been secured in the desired relationship by other means. Also, the binding elements aid in the removal of a sandwich of sheets from the penetrating pins.

I claim:

1. A device for the assembly of a plurality of nonplaniform sheets of material having elevations and depressions, including, in combination, a supporting frame; a sheet holder; a plurality of penetrating members; means for moving said penetrating members relative to said sheet holder for penetration and removal of said sheets therefrom; and registering means controlling the relative positions of successive sheets to be penetrated by said penetrating means so that penetration of successive sheets will occur with the elevations and depressions of each sheet in register, respectively, with the depressions and elevations on the adjacent sheet or sheets.

2. A device for the assembly of a plurality of nonplaniform sheets of material corrugated to form substantially parallel ridges and grooves therein including, in combination, a supporting frame; a sheet holder; a plurality of penetrating members; means for moving said penetrating members relative to said sheet holder for penetration and removal of said sheets therefrom; and registering means controlling the relative positions of successive sheets penetrated by said penetrating means so that penetration of successive sheets will occur with the ridges and grooves of each sheet in register, respectively, with the grooves and ridges on the adjacent sheet or sheets.

3. A device for the assembly of a plurality of nonplaniform sheets of material corrugated to form substantially parallel ridges and grooves therein including, in combination, a supporting frame; a sheet holder; a plurality of penetrating members; means for moving said penetrating members relative to said sheet holder for penetration and removal of successive sheets therefrom; and registering means adapted to shift said sheet holder relative to said penetrating members to an amount equal to a multiple of the amount of space between the center of an adjacent ridge and groove of the material, so that successive sheets may be penetrated with the grooves and elevations in register, respectively, with the elevations and grooves on the adjacent sheet or sheets.

4. The device according to claim 1, said penetrating members carrying binding elements with which said sheets are penetrated, and means for removing said sheets with said binding elements from the device.

5. The device according to claim 1, said penetrating members carrying tubular binding elements with which said sheets are penetrated, and means for removing said sheets with said binding elements from the device.

6. A device for the assembly of a plurality of nonplaniform sheets of material having elevations and depressions respectively of uniform height and depth, including, in combination, a supporting frame; a sheet holder; a plurality of penetrating pins, movable into and out of penetrating engagement with a sheet placed on said sheet holder; and means for adjusting the position of said sheet holder relative to said penetrating pins, whereby a sheet placed on said sheet holder may be penetrated by said pins in a predetermined position.

7. A device for the assembly of a plurality of nonplaniform sheets of material having elevations and depressions respectively of uniform height and depth, including, in combination, a supporting frame; a sheet holder; a plurality of penetrating pins, and common means for bringing said penetrating pins into and out of contact with sheets on said sheet holder and for adjusting the position of said sheet holder relative to said pins whereby a sheet placed on said sheet holder may be penetrated and removed by said pins in a predetermined position.

8. A device according to claim 1, said penetrating members carrying removable caps adapted to support tubular penetrating elements carried on said penetrating members, and means for removing and replacing said caps and said tubular penetrating elements.

LEONARD S. MEYER.

REFERENCES CITED

The following references are of record in the file of this patent:

UNITED STATES PATENTS

| Number | Name | Date |
|---|---|---|
| 370,986 | Stimpson | Oct. 4, 1887 |
| 801,507 | Blanchard | Oct. 10, 1905 |
| 1,100,064 | Ferres | June 16, 1914 |
| 1,855,161 | Wyman | Apr. 19, 1932 |
| 2,350,887 | Goff | June 6, 1944 |
| 2,428,979 | May | Oct. 14, 1947 |